No. 826,210. PATENTED JULY 17, 1906.
M. F. WITT.
APPARATUS FOR ASSORTING FRUIT.
APPLICATION FILED FEB. 26, 1906.
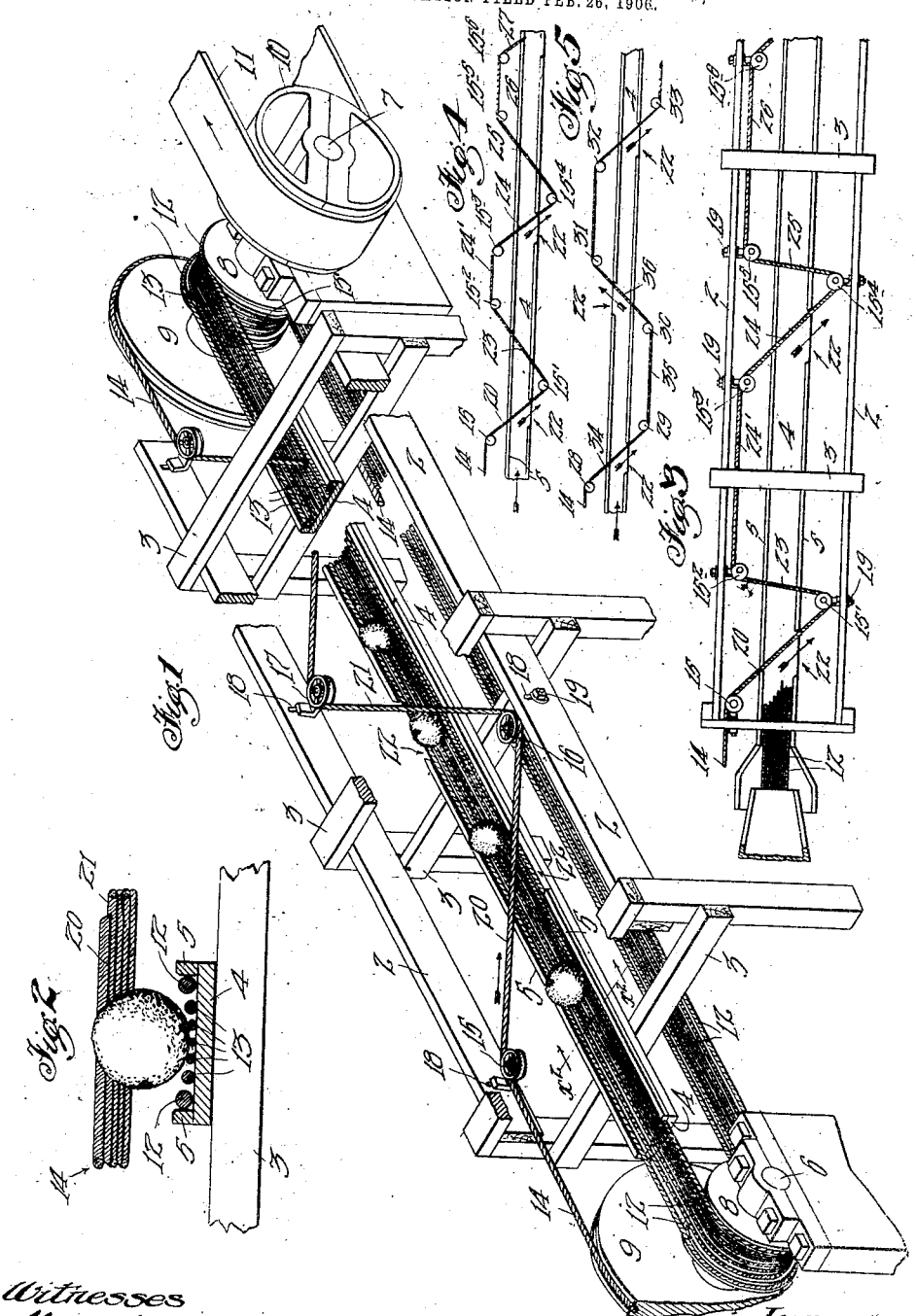

UNITED STATES PATENT OFFICE.

MARTIN F. WITT, OF LOS ANGELES, CALIFORNIA.

APPARATUS FOR ASSORTING FRUIT.

No. 826,210.  Specification of Letters Patent.  Patented July 17, 1906.

Application filed February 26, 1906. Serial No. 302,943.

*To all whom it may concern:*

Be it known that I, MARTIN F. WITT, a citizen of the United States of America, residing in the city of Los Angeles, county of Los Angeles, State of California, have invented certain Improvements in Apparatus for Assorting Fruits, of which the following is a specification.

This invention relates to apparatus for assorting fruit according to its sizes. Devices of this kind are sometimes known as "fruit-graders," and are used to separate the fruit as picked from the trees into its several sizes so that such fruit may be packed in suitable boxes, each box containing fruit of substantially the same size.

The object of this invention is to provide apparatus for this purpose which shall be extremely simple and durable in construction and positive and efficient in operation.

In general the invention consists in the provision of a suitable frame having a horizontal flanged conveyer-bed, a series of endless ropes running in said bed and forming a carrier running throughout the length of the apparatus, and a grading or assorting rope or belt preferably driven from and carried by a large pulley mounted on the same shaft which carries the pulley for said carrier-ropes and crossing said carrier at one or more points along its length and above the surface of said carrier and so mounted that each succeeding crossing is arranged at a less height above said carrier, such grading rope or belt passing over a pulley or sheave at the rear end of the machine and running from such pulley or sheave underneath the machine back to the first-named pulley, with means for driving said carrier and grading-rope.

The invention consists, further, in various details of construction and combinations of parts, all as hereinafter described, and particularly pointed out in the claims, and will be more readily understood by reference to the accompanying drawings, forming a part of this specification, and in which—

Figure 1 is a perspective view of an embodiment of my invention, a portion thereof being broken away. Fig. 2 is a sectional view on the line $x^2$ $x^2$ of Fig. 1. Fig. 3 is a plan view showing a somewhat modified manner of mounting the grading-rope. Figs. 4 and 5 are diagrammatic views showing other modifications of the manner of mounting such grading-rope.

As shown in the drawings, 2 represents a suitable frame which may be of the ordinary or other preferred construction. It is preferably provided with cross-pieces 3, upon which the carrier-bed 4 is mounted. This carrier-bed is preferably provided at its edges with beads 5, forming a trough. As shown, this carrier extends throughout the length of the machine. At each end of the machine is mounted a suitable shaft 6 7, carrying pulleys 8 8 and 9 9, the shaft 7 being also provided with a pulley or sheave 10, driven by means of a belt 11, extending from any suitable source of power.

The conveyer or carrier is composed of a series of ropes running about the sheaves or pulleys 8, the outside ropes 12 being preferably of slightly larger diameter than the intermediate ropes 13 and running in grooves upon the flanges of the pulleys 8, thus providing for a somewhat faster movement of the outer ropes 12, so that the sides of the carrier or conveyer thus formed has a faster longitudinal movement than the center of the conveyer for the purpose hereinafter stated. The intermediate ropes 13 are guided by grooves 13', formed on the face of the pulleys 8.

The sheaves 9 have grooved peripheries and carry the grading-rope 14. As shown in Fig. 1, this grading-rope 14 extends from the pulleys 9 at the front end of the machine about a small idler 15, and thence diagonally across the conveyer or carrier to an idler 16, mounted on the opposite side of the frame of the machine, and thence to another idler 17, and is thus passed as many times across the machine as it is desired to form grades or separations of the fruit.

As shown in Fig. 1, the idlers are carried on adjustable brackets mounted in slots 18 in the frame of the machine, and by means of nuts 19 the vertical position of these idlers may be fixed as desired. Thus it will be seen that the leg 20 of the grading-rope is adjusted at one height with respect to the carrier and bed 4, while the leg 21 is lower and nearer thereto, this being accomplished by the relative positions of the idlers 16 and 17 with respect to the idler 15. As shown in Fig. 1, the bead 5 is cut away, as at 22, to provide discharge-apertures for the fruit. With the arrangement of idlers shown in Fig. 1 the legs 20, 21, and &c., have a slight downward inclination.

In the embodiment of Figs. 3 and 4 the grading-rope 14 passes over successive idlers 15 15' $15^2$ $15^3$ $15^4$ $15^5$ $15^6$, the leg 20 extending in a horizontal plane between idlers 15 and 15'. The idler 15² is raised above the horizontal plane of the idler 15', so that the leg 23 of the grading-rope 14, extending between the idlers 15' and 15², is higher than the leg 20. The leg or portion 24' of the carrier extending between the idlers 15² 15³ runs at an incline by reason of the idler 15³ being lowered with respect to the horizontal plane of the idler 15², thus bringing the leg 24 lower than the leg 20, and this arrangement is duplicated with the legs 25, 26, and 27. It is thus seen that the legs 23, and 25 do not contact with the fruits, but are what we may term "idler-legs," having no active operation upon the fruits passing along the carrier.

In Fig. 5 the grading-rope 14 is mounted on idlers 28 29 30 31 32 33, the leg 34 between the idlers 28 29, forming one grading-leg, extending in a horizontal plane across and above the bed 4 and carrier, while the leg 35, extending between the idlers 29 and 30, has a downward pitch by reason of the idler 30 being mounted lower down on the frame, so that the leg 36 between the idlers 30 31 will cross the bed 4 and carrier in a horizontal plane lower than the leg 34. This same arrangement is continued between the idlers 31 and 32 and 32 33 of the device, so that each of the grading-legs of the grading-rope 14, crossing above the carrier and bed 4, are arranged at graduated heights thereabove. Preferably the grading-rope 14 is moved at greater speed than the travel of the ropes 12 and 13 of the carrier. This is accomplished by the use of pulleys of larger diameter, as shown. By thus moving the grading-rope more rapidly than the movement of the carrier and by mounting the grading-legs or portions of the grading-rope which act upon the fruit on the carrier at an angle to the travel of the carrier I avoid the abrupt stopping of the fruit and obviate any tendency to bruise or injure the tender skin or pulp thereof. Suitable bins and troughs may be provided to receive the fruit from the carrier.

I claim—

1. A fruit-grader comprising a frame, rotating shafts at the ends of said frame, carrier-pulleys on said shafts, said pulleys provided with grooved flanges and faces, ropes mounted in said flanges and grooves, and extending from one of said pulleys through the length of the machine and about the other pulleys forming an endless carrier through the machine, a grading-rope carried by pulleys on said shafts, the upper leg of said grading-rope passing about idlers mounted on opposite sides of said frame, said carrier-rope crossing over said carrier above the same, and means for rotating one of said shafts.

2. A fruit-grader comprising a frame, rotating shafts at the ends of said frame, carrier-pulleys on said shafts provided with grooved flanges, a bed extending longitudinally of said frame, ropes mounted in the grooves of said flanges and forming continuous bands extending about said pulleys and along said bed, intermediate ropes mounted on the faces of said pulleys and extending therebetween and thereabove and over the surface of said bed, a grading-rope mounted above said carrier and having legs or portions crossing over said carrier at graduated heights thereabove, means for moving said grading-rope, and means for rotating said carrier.

3. A fruit-grader comprising a frame, rotating shafts at the ends of said frame, carrier-pulleys on said shafts provided with grooved flanges, a bed extending longitudinally of said frame, a series of ropes mounted in said grooved flanges and on the faces of said pulleys and extending over said bed and forming a continuous carrier through said machine, pulleys on said shafts, a grading-rope forming a continuous band extending about said last-named pulleys, portions of said grading-rope being carried about idlers mounted upon opposite sides of said bed at graduated heights thereabove, means for adjusting the positions of said idlers, and means for rotating said shafts.

4. A fruit-grader having a frame, a horizontal flanged conveyer-bed supported thereby, a series of endless ropes running in said bed and forming a carrier, means for supporting and rotating said ropes, an assorting or grading rope crossing above said carrier at graduated heights, and means for supporting and rotating said grading-rope.

In testimony whereof I have hereunto set my hand, at Los Angeles, California, this 20th day of February, 1906.

MARTIN F. WITT.

In presence of—
 FREDERICK S. LYON,
 VERNA A. TALBERT.